(12) United States Patent
Lejin P J

(10) Patent No.: US 11,750,460 B1
(45) Date of Patent: Sep. 5, 2023

(54) IDENTIFYING DUPLICATE ENTRIES IN VIEWS OF SAME AND OTHER NETWORK MANAGEMENT INTERFACES

(71) Applicant: Salesforce, Inc., San Francisco, CA (US)

(72) Inventor: Jose Lejin P J, Karnataka (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/961,369

(22) Filed: Oct. 6, 2022

(51) Int. Cl.
*H04L 41/0873* (2022.01)
*H04L 41/22* (2022.01)

(52) U.S. Cl.
CPC .......... *H04L 41/0873* (2013.01); *H04L 41/22* (2013.01)

(58) Field of Classification Search
CPC ................. H04L 41/0873; H04L 41/22; H04L 67/02–025
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |

(Continued)

*Primary Examiner* — Brendan Y Higa
(74) *Attorney, Agent, or Firm* — Schwabe Williamson & Wyatt

(57) ABSTRACT

Techniques are provided for identifying duplicate usages of configuration values in Network Management Interfaces (NMIs). Network administrators may inadvertently enter duplicate values such as Internet Protocol addresses in one or more NMIs. A browser extension captures a configuration value and determines whether it has been used already, such as by accessing a database with the value and a field type. If it has been used, summary and/or detailed information can displayed on the NMI describing the duplicate usages. The summary display can be a hyperlink which indicate a number of duplicate usages in other views and NMIs. When the hyperlink is selected, a pop-up display can provide detailed information by rendering the other views in a read-only mode, of a same NMI or other NMIs. To render the views, a Document Object Model and Cascading Style Sheet Object Model of the views can be accessed.

20 Claims, 11 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteqee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,027,535 B1 * | 7/2018 | Watsen ............... G06F 9/44505 |
| 11,520,459 B1 | 12/2022 | Lejin P J |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0116485 A1 * | 8/2002 | Black ................... H04L 41/344 709/227 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0108375 A1 * | 5/2005 | Hallak-Stamler ....... G06F 3/067 709/212 |
| 2005/0114315 A1 * | 5/2005 | Tanner ................... H04L 41/22 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |

(56) References Cited

U.S. PATENT DOCUMENTS

| | | |
|---|---|---|
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2018/0219739 A1* | 8/2018 | Berry .................... H04L 67/75 |
| 2019/0312775 A1* | 10/2019 | Patil .................... H04L 41/085 |

* cited by examiner

IDENTIFYING DUPLICATE ENTRIES IN VIEWS OF SAME AND OTHER NETWORK MANAGEMENT INTERFACES

TECHNICAL FIELD

One or more implementations relate to the field of configuring network devices; and more specifically, to techniques for identifying duplicate usages of configuration values in same and other network devices.

BACKGROUND ART

When a computer network of devices is built or modified, the devices need to be configured so that they can operate properly. The devices can include, e.g., personal computers (PCs), laptops, application servers, database servers, gateways, load balancers and routers. In one approach, a network administrator accesses Network Management Interfaces (NMIs) associated with the devices. For example, a different NMI may be used for each device manufacturer or type. In some cases, a team of network administrators is involved in configuring the devices. The devices are configured with data such as Internet Protocol (IP) address, port number, and Secure Sockets Layer (SSL) certificates. However, various challenges are presented in configuring the devices, especially when multiple devices are involved.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
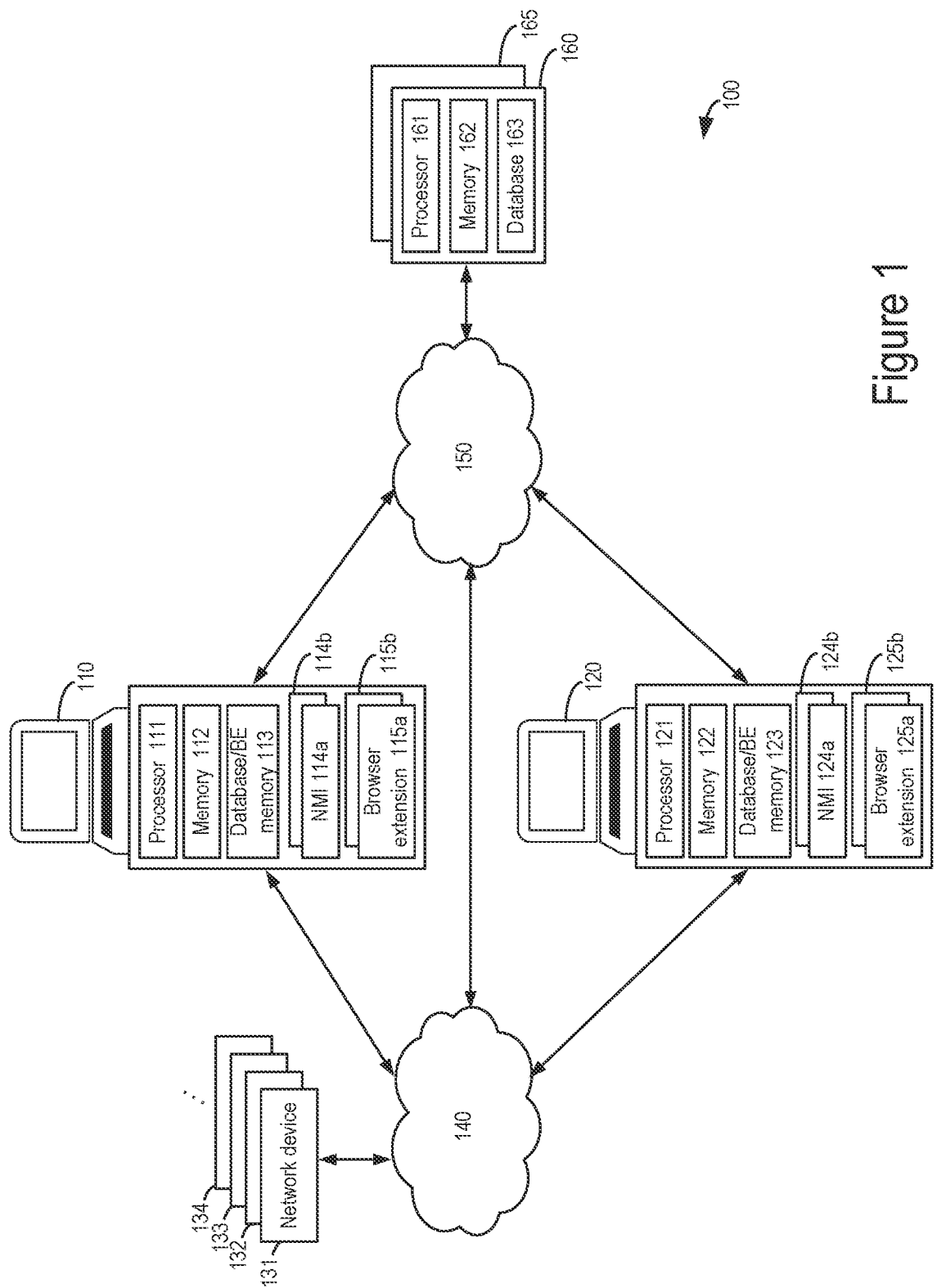
FIG. 1 is a block diagram of a computing system 100 in which network devices are configured using Network Management Interfaces (NMIs), according to some example implementations.

The following description describes technologies for configuring network devices, including identifying duplicate usage of configuration values in same or different network devices.

Network administrators are often tasked with the job of configuring multiple network devices in large networks. For example, a network of a large organization such as a business or university can have hundreds or even thousands of devices. The manufacturers of the devices provide Network Management Interfaces (NMIs) to assist in configuring the devices. The NMIs are typically web applications which the administrators interact with by entering configuration values for the corresponding devices. In some cases, each device is individually configured by the administrators typing the configuration values into input fields of the NMIs. The NMIs can have different views in which the administrators enter the configuration values.

In addition to configuring network devices, cloud solutions can be configured. A cloud solution refers, e.g., to applications, storage, on-demand services, computer networks, or other resources that are accessed with an internet connection through another provider's shared cloud computing framework. Cloud computing is the delivery of computing services such as servers, storage, databases, networking, software, analytics, and intelligence on a pay as you go basis.

To build a full solution, the administrators may need to configure multiple devices/cloud solutions by using multiple NMIs. This is common in building end-to-end cloud solutions or large networks. For instance, to build a fully scalable web service, the administrators may need to configure Web Servers, Cache Solutions, Content Delivery Network (CDN) Solutions, Databases, Server Side Dependent Devices, Gateways, Firewalls and so forth. As another example, to configure a Local Area Network (LAN) for an office, the administrator needs to configure multiple types of devices such as routers, switches, gateways and so forth.

However, it is problematic that the same configuration value may repeated in multiple views of multiple NMIs where these values finally take effect in corresponding devices/cloud solutions. For instance, a specific IP address value or certificate value can be used in fields of multiple views of network devices/cloud solutions. In some cases, the duplicate use of a configuration value is not a conflict. For example, devices in different private networks can reuse the same IP address. In other cases, there is a conflict and the network will not work properly if the duplication is not corrected. For example, two routers in a local area network cannot have the same public IP address. However, two routers can have the same private IP address if they are connected to different public networks. In another example, a same certificate value may need to be entered in a Gateway and a Firewall without any issues.

Even if an individual administrator is careful to avoid a duplicate usage, another administrator who is configuring the same network may inadvertently and inappropriately re-use the same configuration value.

Moreover, a security risk can be presented when an administrator is not fully aware of the current configuration status of a network. For example, sensitive information such as SSL certificates/keys can be compromised. An SSL certificate is a digital certificate that authenticates a website's identity and enables an encrypted connection.

One possible solution involves a user querying the configuration via a command line. However, such approaches are labor intensive, do not provide detailed user friendly information such as the specific views involved, and do not provide the detailed information across multiple NMIs.

The techniques disclosed herein address the above and other issues. In one aspect, when a user provides an entry of a configuration value in a NMI, a browser extension captures the parameter and accesses a database to determine if there is a duplicate usage. The browser extension can further identify views of one or more NMIs in which the configuration value is used. This information can be presented to the user in different ways. In one possible approach, a hyperlink is displayed on the user's view of the NMI and includes text which summarizes a number of views and number of NMIs in which the configuration value is used. The user can select the hyperlink to call up a pop-up display of details regarding the duplicate usages. The pop-up display can include renderings of the views based on a Document Object Model (DOM) and a Cascading Style Sheet Object Model (CS-SOM) with associated JavaScript. DOM and CSSOM are dynamically created and handled via JavaScript logic. For example, when clicking on a summary view, the logic to open the pop-up is written in JavaScript logic. The user can then decide whether a duplication is a conflict and, if it is a conflict, change the entry. If the duplication is not a conflict, the user can confirm the configuring of a network device, for example, using the existing configuration value.

A local and/or remote database can be updated based on the new configuration. In one approach, a server maintains a database of configuration information and the web browser periodically polls the server to obtain updates to the information, and update a local database or browser extension memory accordingly. A local database or browser extension memory on the user side, where web browser is used with a browser extension, is optional. The database on the server side. is a primary storage location for data The techniques provide a number of advantages including:

Easily understand where a specific configuration value for a specific type field is used in the same NMI or any other NMI.

Automatically detect specific fields of specific views as soon as value is entered. Summary links are shown only when the user comes out of focus of that field, in one approach.

The specific fields which are to be evaluated for duplicate values can be determined by the NMI app owner or other party as needed. The input to this solution is, the app owner provides information about the specific views and its specific fields which need this kind of summary/detailed information.

Automatically show if the configuration value entered is used in the same type of field in any other views of the same NMI.

Automatically show a count of views and NMIs in which a configuration value is duplicated.

Automatically show if this configuration value entered is used in the same type of field in any other views of the different NMIs.

Automatically show a summary and/or detailed view of all views in which the configuration value entered is used, for the same NMI or any other NMI.

Display the actual views in which the same value is used, in read-only format, with the ability to zoom in or out to see the view clearly. The views are shown for viewing purpose only, so it will be read-only, in an example implementation.

Provide the user with the option to turn off the displaying of some views in case the user is not interested in continuing to see these views.

Continue tracking usage of the data in any other view of the same or another NMI.

Dynamically generate User Interface (UI) elements as per a desired user experience (UX), which will be automatically injected to the current view where the user enters the configuration value.

Lightweight browser extension which the end user installs in the Web Browser on the user side, to automatically understands data input to specific fields of specific views.

Lightweight browser extension which the end user installs in the Web Browser on the user side, which automatically recognizes a data reference in any other view of the same or different NMI for specific field types.

Works well with any kind of Web Apps. Provides a generic solution for any NMI web apps. Examples of web apps include server side rendering web apps, single page web apps, multi-page web apps, Legacy HTML/JavaScript (JS) web apps, and HTML5 web apps.

Improve usability while entering values in specific fields of specific views, giving clear information about where the values were previously used, for the same or different NMI.

Provide an end-to-end total solution including server side, client side and a browser extension.

These and other advantages will be further apparent in view of the following discussion.

FIG. 1 is a block diagram of a computing system 100 in which network devices are configured using Network Management Interfaces (NMIs), according to some example implementations. The system includes example network devices 131, 132, 133 and 134 which are associated with one or more networks 140. For example, these could be private networks of an organization. Four devices are depicted for simplicity. In practice, such networks could have many more devices. The one or more networks 140 are in communication with one or more administrators (admins), also referred to as users, and their respective computing devices, such as laptop computers or PCs. For example, first and second users may use client computing devices 110 and 120, respectively, to configure the devices. Two user computing devices are depicted for simplicity since, in practice, many more administrators and their computing devices could be used. For example, dozens of administrators can be used in a team to configure a large network. The client computing device 110 includes a processor 111, a memory 112, and a database or BE (browser extension) memory 113. The memory can store instructions which are executed by the processor to perform the functions described herein. The database 113 can store configuration data for the devices. The database/BE memory 113 on the client side is optional and data can be stored in the browser extension memory itself. The main database on the server side can store all JSON data.

The client computing device 110 runs software to provide access to one or more NMIs such as example NMIs 114a and 114b. The NMIs can be provided as web applications. The NMIs are accessed on the client side and hosted in web servers. A web app is an application program that is stored on a remote server and delivered over the Internet through a browser 115b. The laptop further runs software to provide a browser extension 115a. A browser extension is a small software module for customizing logic in a web browser. Browsers typically allow a variety of extensions, including user interface modifications, cookie management, ad blocking, and the custom scripting and styling of web pages. The browser extension adds a functionality to the NMI to provide information regarding duplicate usages of configuration values which are entered into fields of the NMIs. The browser extension is on the end user or client side, where user accesses a web app via a web browser.

Similarly, the client computing device 120 includes a processor 121, a memory 122, and a database/BE memory 123. The database/BE memory 113 on the client side can store the same configuration data for the devices as the database/BE memory 113. The laptop further runs software to provide one or more NMIs 124a and 124b, a web browser 125b and a browser extension 125a.

The client computing devices 110 and 120 and the one or more networks 140 can communicate with one or more servers 160 and 165 via one or more networks 150. This could represent a public network such as the Internet, for example. In another approach, the servers are connected to the one or more networks 140 on which devices are being configured. Each server includes a processor, memory and database. For example, the server 160 includes a processor 161, a memory 162 and a database 163. The memory can store instructions which are executed by the processor to perform the functions described herein.

A browser extension REST API is at the web app server side, where the primary database will be (admin or owner side where web app is hosted). Most of the time, the web app will be hosted inside the network device itself at the web app server side.

The database 163 can store configuration data for the devices, where this data is updated by the computing devices of the administrators when a device is newly configured. The computing devices can also periodically poll the server to obtain updated data for their local databases/BE memories 113 and 123, when used. In this way, the computing device 120 can obtain updated data based on configurations made by the computing device 110, for example. In one approach, when a new configuration is made, the computing device stores a record of it at its local database/BE memory and also updates the database of the remote server. In another approach, all updates are to the remote server.

Figure 2A:
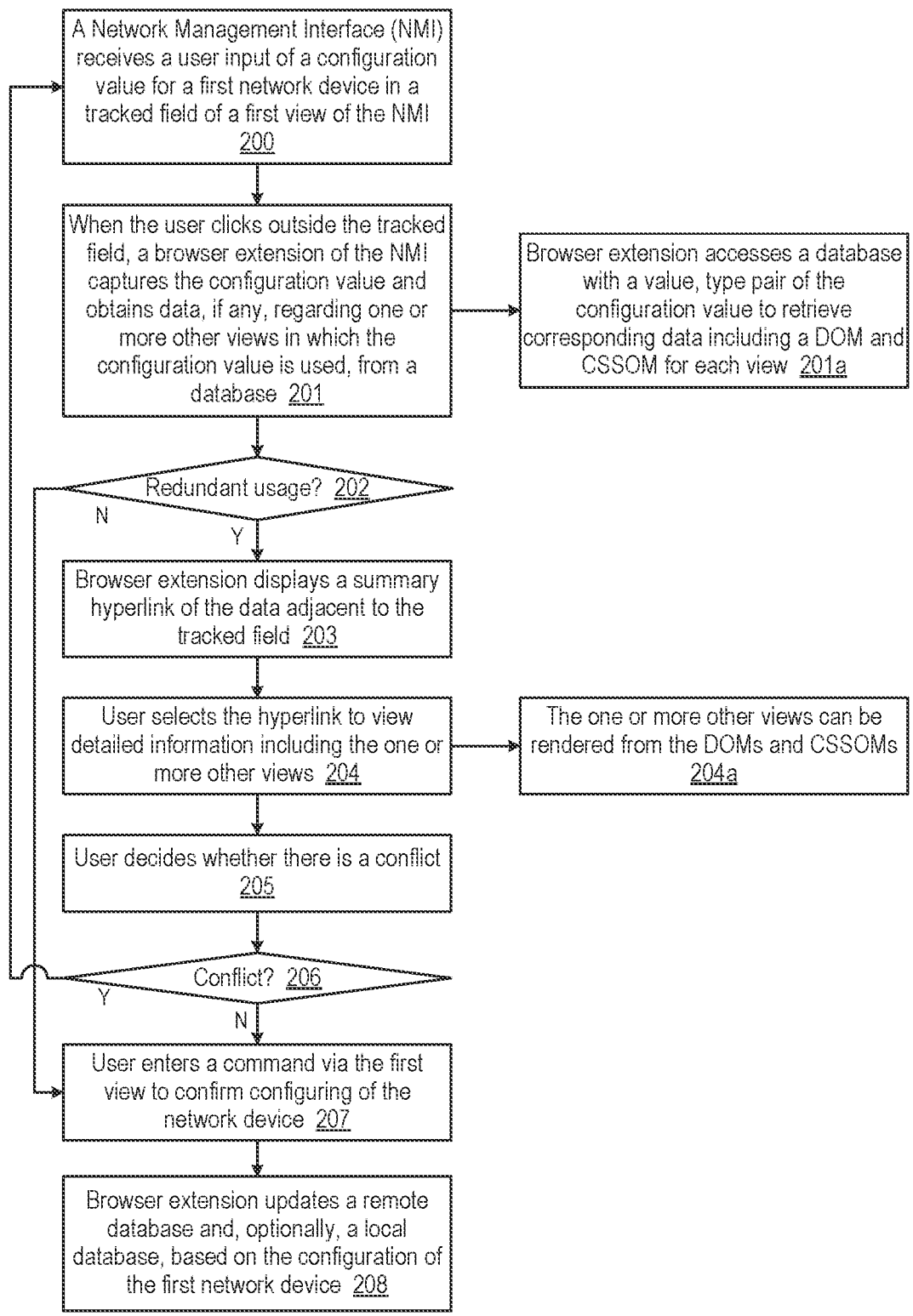
FIG. 2A is a flowchart of an example process at the client computing devices 110 and 120 of FIG. 1 for configuring network devices while identifying duplicate entries in views of NMIs, according to some example implementations.

FIG. 2A is a flowchart of an example process at the client computing devices 110 and 120 of FIG. 1 for configuring network devices while identifying duplicate entries in views of NMIs, according to some example implementations. The process may be performed each time the user enters a configuration value in an input field of a view/form of an NMI and comes out of focus of the field such as by clicking outside the field or pressing the tab key.

At step 200, a Network Management Interface (NMI) receives a user input of a configuration value for a first network device in a tracked field of a first view of the NMI. For example, see the view 300 and field 310 of FIG. 3. The configuration value could include, e.g., an IP address, a SSL certificate value, a port number, an entity name or a Uniform Resource Locater (URL). At step 201, when the user clicks in the first view outside the tracked field, such as by using a pointing device, a browser extension of the NMI captures the configuration value and obtains data, if any, regarding one or more other views in which the configuration value is used, from a local database/BE memory or a remote database. This step can include step 201a, in which the browser extension accesses a database with a value, type pair of the configuration value to retrieve corresponding data including a DOM and CSSOM for each view in which the configuration value is used. These are the duplicate usages. An example of a type, value pair is type=IPv4 address, value=10.2.2.119. IPv4 refers to an IP version 4 address.

A decision step 202 determines whether there is a duplicate usage. If the answer is no (N), step 207 is reached where the user enters a command via the first view to confirm configuring of the network device. For example, the user can click a "create" or "submit" button to confirm the configuring. See, e.g., the Create button 350 in FIG. 5. The configuring of first network device can involve communicating a signal to a server and/or the first network device. The first network device receives and stores the configuration value in non-volatile memory. At step 208, the browser extension updates the database and/or BE memory based on the configuration of the first network device. In one approach, the browser extension transmits configuration data to a server 160 to update a remote database 163 and optionally, also updates a local database/BE memory at the user's computing device.

If the answer to decision step 202 is yes (Y), at step 203, the browser extension displays a summary hyperlink of the data adjacent to the tracked field, in one possible approach. For example, see the hyperlink 510 in FIG. 5. The summary hyperlink or other information warns the user that there is at least one duplicate usage of the configuration value and therefor a potential conflict.

At step 204, the user selects the hyperlink to view detailed information, including the one or more other views. See the pop-up 710 of FIG. 7A, for example. This step can include step 204a, where the one or more other views can be rendered from the DOMs and CSSOMs in a database. At step 205, the user decides whether there is a conflict. For example, the user can view the detailed information and determine the networks and devices involved in the duplicate usage. The user can apply basic principles of network administration and use their professional judgement. For example, if the device with the duplicate usage is in the same network as the first network device, there is likely a conflict.

As an example, the one or more other views comprise a second view of the first NMI by which a second network device is configured with the configuration value. As another example, the one or more other views comprise a view of a second NMI by which a second network device is configured with the configuration value.

At decision step 206, if there is no conflict (N), step 207 is reached, where the user enters a command via the first view to confirm configuring of the network device, as discussed. If there is a conflict (Y), the process returns to step 200 where the user enters a new configuration value.

The browser extension can be installed whenever the user accesses any NMI of interest. The browser extension takes care of capturing the data in a specific field of a specific type, in any of the configuration views of the NMI. This can be done by scanning for configuration forms and HTML inputs. The specific field types will be detected based on information provided by the app owner, e.g., via an HTML input element type, a label or attribute.

In case an entity is deleted, which was added in a view with a specific value in a specific field, the server side takes care of deleting this from the JSON code which is stored in each NMI server side document database. As a result, the browser extensions always receive the correct information about all of the views from all the NMIs, when requesting for a specific value in a specific field type.

Figure 2B:
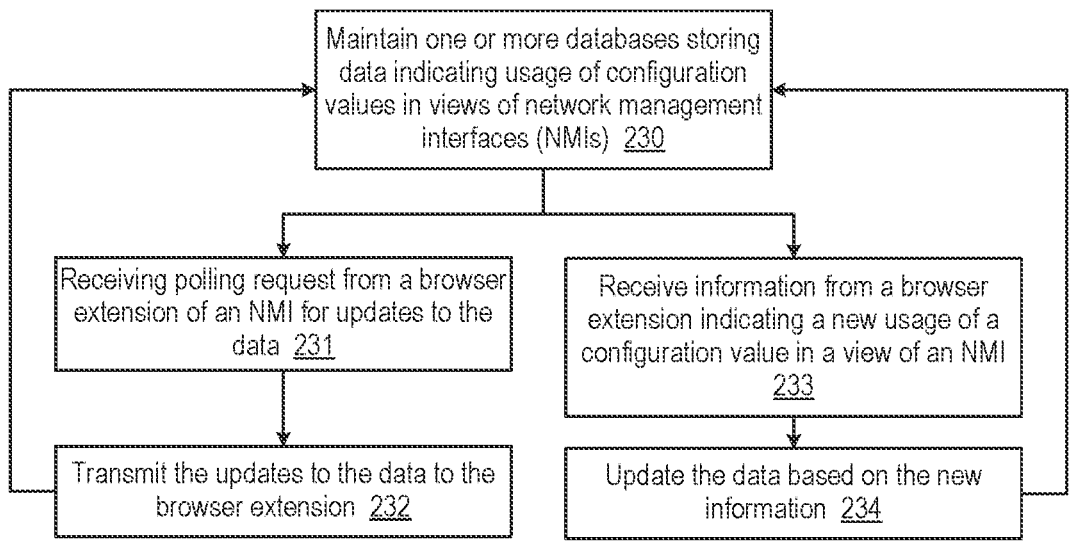
FIG. 2B is a flowchart of an example process at the servers 160 and 165 for maintaining data for identifying duplicate entries in views of NMIs, according to some example implementations.

FIG. 2B is a flowchart of an example process at the servers 160 and 165 for maintaining data for identifying duplicate entries in views of NMIs, according to some example implementations. As mentioned, one or more servers can maintain databases of configuration data for access by the computing devices of all network administrators so that the data can be synchronized among the computing devices. The computing devices, via their browsers, can periodically poll the one or more servers to request any updated data. The computing devices use this data to update their local databases. The polling can be fairly frequent, such as once per minute, to ensure that all computing devices are updated with the same configuration data. Additionally, the computing devices can transmit updates to the one or more servers based on confirmed configurations performed by the users of the computing devices via the NMIs. The communications between the computing devices and servers can involve HTTP (Hypertext Transfer Protocol) GET and PUT methods of REST (Representational State Transfer), for example.

Step 230 includes maintaining one or more databases storing data indicating usage of configuration values in views of network management interfaces (NMIs). For example, see database 163. In a polling process, step 231 includes receiving a polling request from a browser extension of an NMI for updates to the data. This could be a GET request, for example. In response, if there are any updates, step 232 includes transmitting the updates to the data to the browser extension. If there are no updates, the serve could transmit null data or not respond to the polling request. The server knows if a browser extension has not yet received an update based on the polling interval. The server can also keep a record of updates sent to a browser extension.

In an update process, step 233 includes receiving information from a browser extension indicating a new usage of a configuration value in a view of an NMI. In response, step 234 includes updating the data in the database based on the new information.

Polling allows the browser extensions to have the latest information about the configurations in different NMIs for value/field. Before the polling, the browser extension is authenticated with all the NMIs. For example, assume in an office network that three network devices are being configured. The browser extension will keep polling these device's server side, browser extension REST (Representational State Transfer) endpoints. So, it will always have information about what the values and field types being configured on these devices. Assume the user configured one IP address in device 1. Now the user is trying to configure the same IP address in device 3. As soon as the NMI web app of device 3 is opened and the user tries to configure the same IP address as for device 1, since the browser extension already polled device 1 and has information about it, the browser extension immediately informs the user that the same IP address is already used in device 1.

Figure 3:
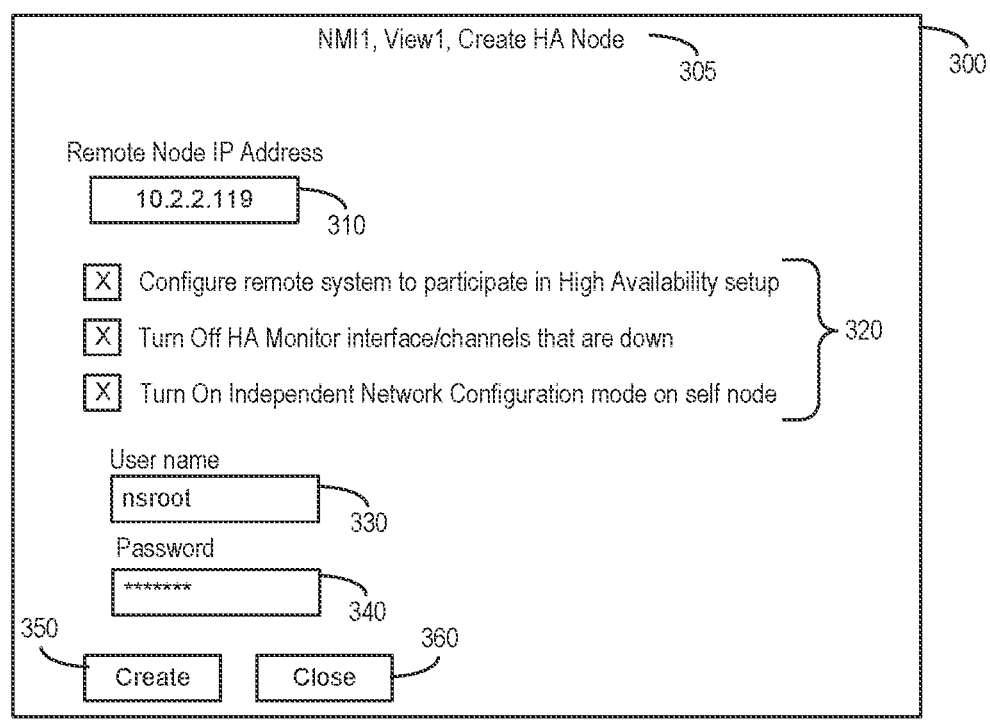
FIG. 3 depicts an example view 300 of an NMI in which a configuration value such as an Internet Protocol (IP) address is entered in a field 310, according to some example implementations.

FIG. 3 depicts an example view 300 of an NMI in which a configuration value such as an Internet Protocol (IP) address is entered in a field 310, according to some example implementations. The title 305 of the view identifies the NMI (NMI1), the view of the NMI (View') and a description of the function of the view, e.g., "Create HA (High Availability) Node. To achieve high availability for any device, a second node is configured as backup to a first node to ensure high availability if the first node goes down.

A user has entered an IP address 10.2.2.119 in the field 310. One or more users may have configured this same value (configuration value) in multiple views of the same NMI and/or other NMIs.

An area 320 of the view includes check boxes for other features of the configuration. These check boxes could also be tracked fields. The technique herein could determine whether combinations of multiple configuration values are use, such as a particular IP address in combination with one or more check box values, Additionally, a field 330 is for a user name and a field 340 is for a password. These credentials may be required for the user to confirm the configuring process when selecting a "Create" button 350. In other cases, the use confirms their credentials in another view. The user can cancel the view by selecting the "Close" button 360.

Figure 4:
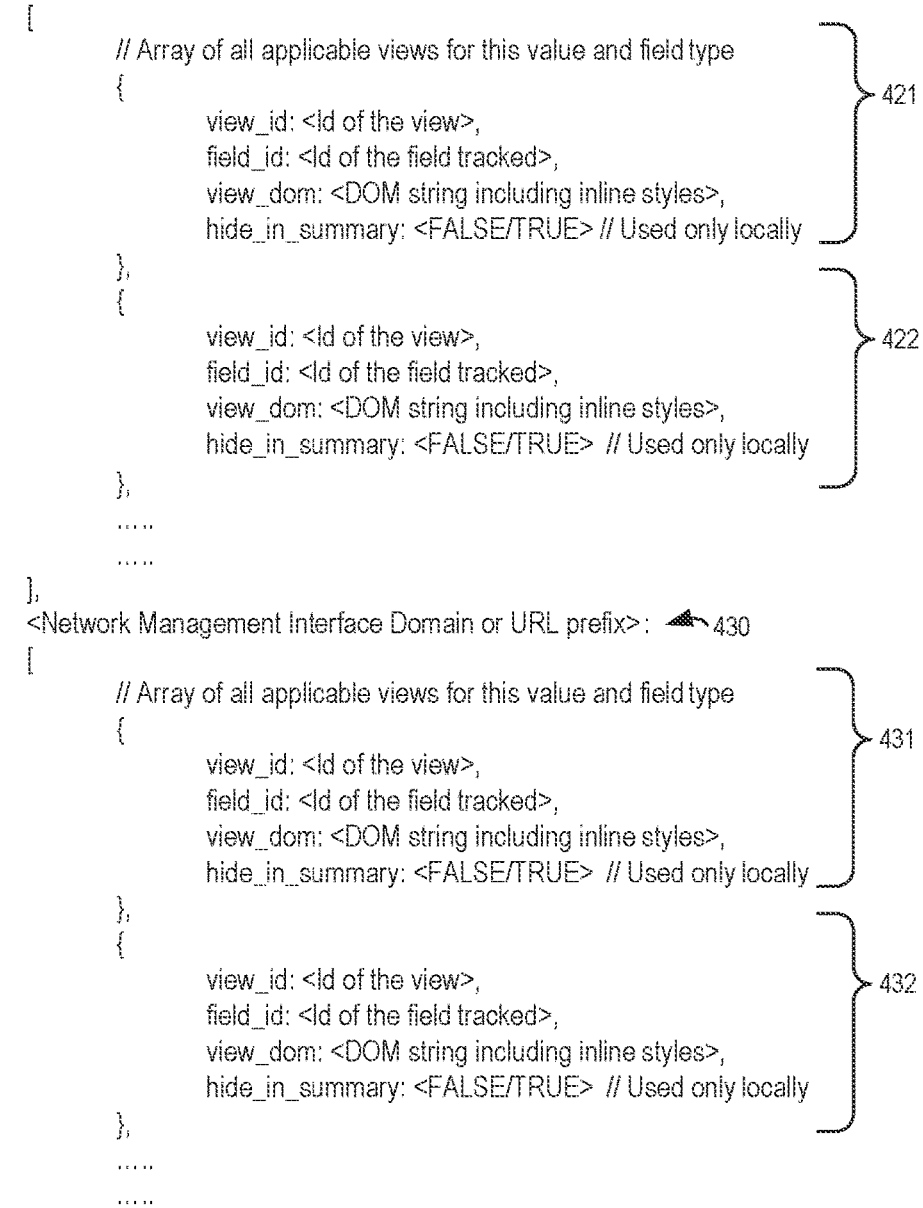
FIG. 4 depicts example JSON data format code at the browser extensions 115*a* and 125*a* of FIG. 1 for capturing configuration values via views of NMIs such as the view 300 in FIG. 3, according to some example implementations.

FIG. 4 depicts example JSON data code at the browser extensions 115a and 125a of FIG. 1 for capturing configuration values via views of NMIs such as the view 300 in FIG. 3, according to some example implementations. The code is in JavaScript Object Notation (JSON) as an example. JSON is a standard text-based format for representing structured data based on JavaScript object syntax. It can be used for transmitting data in web applications (e.g., sending some data from the server to the client, so it can be displayed on a web page, or vice versa, from a client to a server). The JSON data format code is the format in which details are captured and stored in the database, in an example implementation.

In one possible implementation, a browser extension can be used to gather information from the views, handle data transfer involving a local and/or remote database, and display information regarding duplicate usages of configuration data on the views. The browser extension can be integrated with the NMI, which is a web application.

The JSON data code includes a string of value, field type pairs (<value>_<field type>), one pair for each configuration. The code depicted is for a single value, field type pair. Additional code for other value, field type pairs can follow. For each value, field type pair, one or more NMIs are identified in which the pair is used. Also, for each NMI, one or more views are identified in which the pair is used. In this example, there is a first NMI identifier 420 followed by data fields for a first view 421 and data fields for a second view 422 of the first NMI. There is also a second NMI identifier 430 followed by data fields for a first view 431 and data fields for a second view 432 of the second NMI.

The data fields include: view_id: <Id of the view>, field_id: <Id of the field tracked>, view_dom: <DOM string including inline styles>, and hide_in_summary: <FALSE/TRUE>// Used only locally.

The id of the view can refer to the root HTML element id of the view. For example, consider a simple view with first-name, last-name form with a submit option. In the below example code of the view, the id is "my-simple-view". The identifiers of fields tracked are "first-name" and "last-name".

```
<div id="my-simple-view">
  <form style="colorblue;text-align:center;">
    <label>First name:</label><br>
    <input type="text" id="first-name">
    <label>Last name:</label>
    <input type="text" id="last-name">
    <input type="submit" value="Submit">
  </form>
</div>
```

Moreover, the DOM string of the above view is: <div id="my-simple-view"><form style="colorblue;text-align:center;"><label>First name:</label><br><input type="text" id="first-name"><label>Last name:</label><input type="text" id="last-name"><input type="submit" value="Submit"></form></div>.

The last field, hide_in_summary, is a flag which allows the user to hide views in a pop-up of detailed information such as discussed in connection with FIG. 7A, as per interest of user. In this case, the data indicating usage of configuration values in views of NMIs comprises, for each view of each NMI, a flag to prevent or allow display of the view by the browser extensions.

In this format, the primary key of JSON is a combination of value and field type where it is entered. It will have information about all the NMI domain or URL prefix, where these values are used in specific field types. It will store information about all the views that are actually submitted by any of the users for this specific value in a specific field type.

Figure 5:
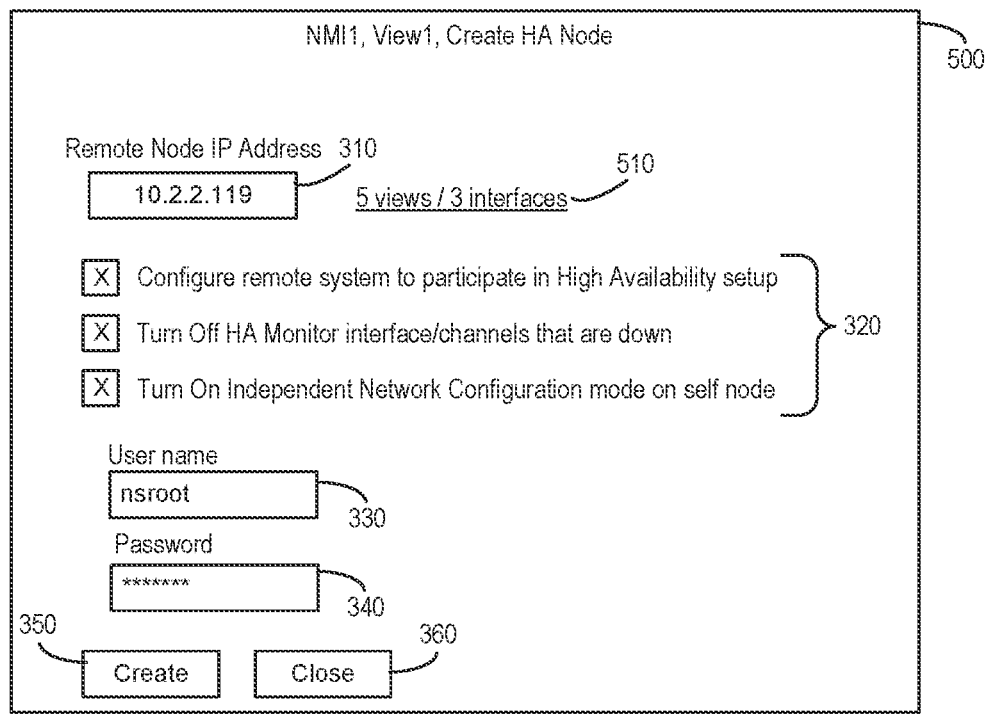
FIG. 5 depicts an example view 500 corresponding to the view 300 of FIG. 3 with the addition of a summary hyperlink 510 indicating duplicate usage of a configuration value, according to some example implementations.

FIG. 5 depicts an example view 500 corresponding to the view 300 of FIG. 3 with the addition of a summary hyperlink 510 indicating duplicate usage of a configuration value, according to some example implementations. The summary hyperlink states: "5 views/3 interfaces," indicating there are a total of five views among 3 NMIs in which the configuration value is used in the associated field. This is one possible implementation of displaying summary information to the user. In this case, the summary information is displayed overlaid on the view 300, to provide the view 500. This maintains a continuity for the user. Additionally, the summary information is displayed adjacent to the field 310 in which the configuration value is input. This makes it easy for the user to see and associated with the input field. If there is no duplicate usage, the summary information can be omitted or another message such as "no duplication" can be used. The user can select the hyperlink to view detailed information regarding the duplicate usage.

In another possible approach, the display provides a button or other selectable component which triggers the display of the view of the detailed information.

If the user edits the configuration value in the field 310, the summary hyperlink may disappear, if there are no duplications of the value in the field. Or, the summary hyperlink can be rendered again with new information based on the edited value.

Figure 6:
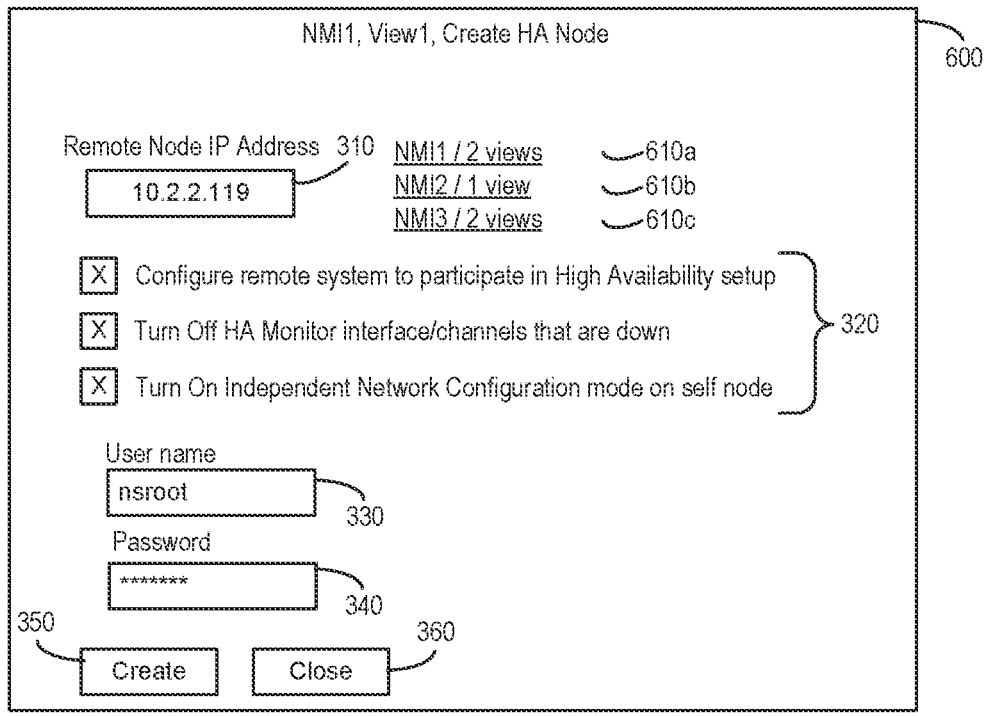
FIG. 6 depicts an example view 600 corresponding to the view 300 of FIG. 3 with the addition of three summary hyperlinks 610*a*, 610*b* and 610*c* indicating duplicate usage of a configuration value in each of three NMIs, according to some example implementations.

FIG. 6 depicts an example view 600 corresponding to the view 300 of FIG. 3 with the addition of three summary hyperlinks 610a, 610b and 610c indicating duplicate usage of a configuration value in each of three NMIs, according to some example implementations. This is another possible implementation of displaying summary information to the user. The user can select one of the hyperlinks to view detailed information for a particular NMI only. This may assist the user in evaluating the duplicate usage.

The first summary hyperlink 610a states: "NMI1/2 views," indicating there are two views in NMI1 in which the configuration value is used. The second summary hyperlink 610b states: "NMI2/1 view," indicating there is one view in NMI2 in which the configuration value is used. The third summary hyperlink 610c states: "NMI3/2 views," indicating there are two views in NMI3 in which the configuration value is used.

Figures 7A, 7B:
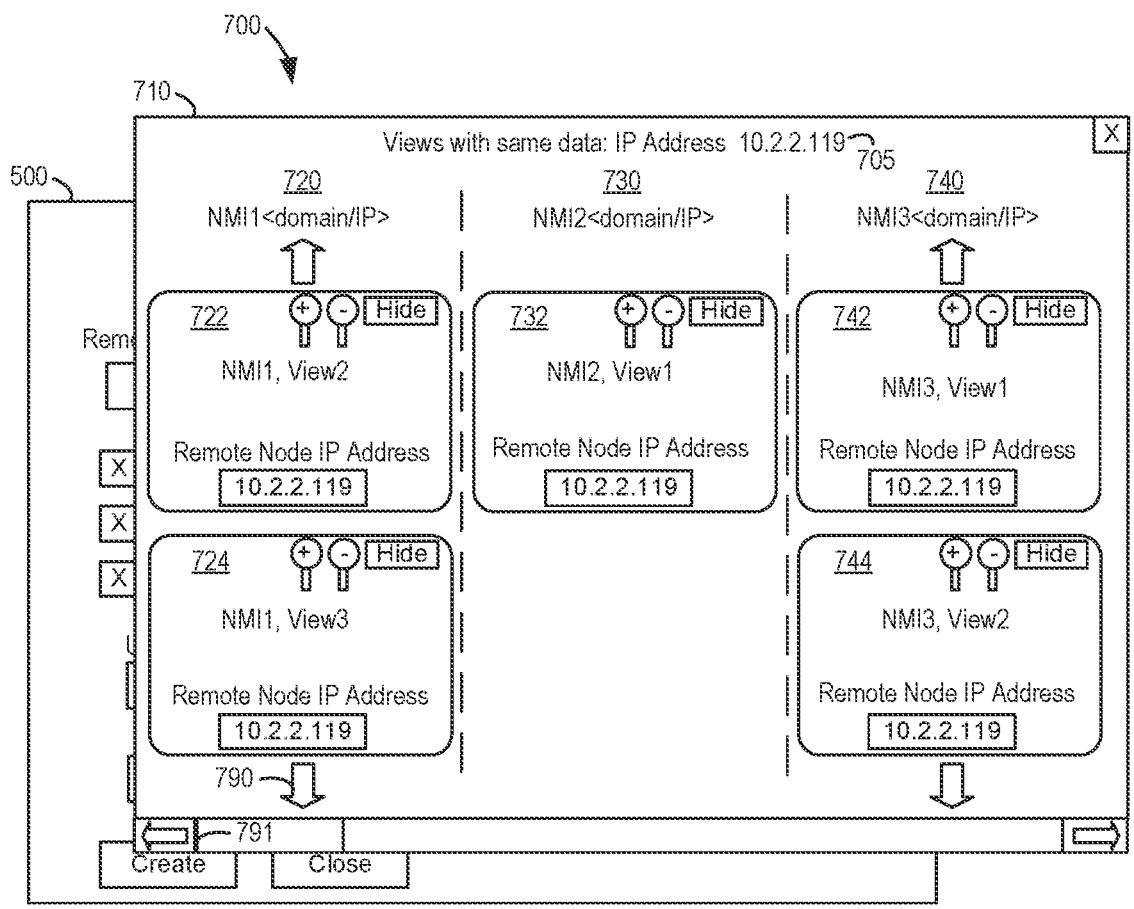
FIG. 7A depicts an example view 700 corresponding to the view 500 of FIG. 5 with the addition of a detailed pop-up 710 indicating duplicate usage of a configuration value, in response to a user selection of the summary hyperlink 510 of FIG. 5, according to some example implementations.
FIG. 7B depicts an example IP address view for use in the regions 722, 724, 732, 742 and 744 of FIG. 7A, according to some example implementations.

FIG. 7A depicts an example view 700 corresponding to the view 500 of FIG. 5 with the addition of a detailed pop-up 710 indicating duplicate usage of a configuration value, in response to a user selection of the summary hyperlink 510 of FIG. 5, according to some example implementations. Displaying a pop-up or overlay over the view 500 helps maintains continuity for the user. However, another option is to provide the detailed information in a separate, new view.

The pop-up includes a title 705 which states: "Views with same data: IP Address 10.2.2.119." This informs the user of the value, type pair which the information is for. The value entered in the field is 10.2.2119 and the type of the field is "IP address." A first part 720 of the pop-up 710 is for NMI1<domain/IP>, a second part 730 of the pop-up 710 is for NMI2<domain/IP>, and a third part 740 of the pop-up 710 is for NMI3<domain/IP>. These are the three NMIs referred to in FIGS. 5 and 6. The term <domain/IP> refers to a domain or IP address of the NMI. This example uses an IP address to access an NMI. However, other examples could involve the user using a domain to access an NMI. An IP address is an address that computers, servers and other devices use to identify one another online. A domain name is the information entered into a web browser to reach a specific website, and functions as a link to an IP address.

Generally, an NMI can be accessed via a domain or IP address. For example, a Wi-Fi router device in the home is typically accessed with an IP address. So, the NMI of the Wi-Fi device is accessed via an IP address. In contrast, office network devices such as a gateway or load balancer typically have a domain which administrators use to access their NMIs. Each NMI will have a unique IP address or domain. For example, with two routers in an office network, there may be two unique IP addresses or domain URLs to access the respective configuration interfaces (NMIs).

The first part of the pop-up includes a region 722 with information of NMI1, View2, including the IP address 10.2.2.119, and a region 724 with information of NMI1, View3, including the IP address 10.2.2.119. Recall that in the examples of FIG. 5, NMI1, View1 was the view in which the user entered the configuration value. These are two different views of NMI1 where the same IP address is used.

The second part of the pop-up includes a region 732 with information of NMI2, View1, including the IP address 10.2.2.119. This is one view of NMI2 where the same IP address is used.

The third part of the pop-up includes a region 742 with information of NMI3, View1, including the IP address 10.2.2.119, and a region 744 with information of NMI3, View2. These are two views of NMI3 where the same IP address is used.

Each region includes a magnifier (zoom in) function to allow the user to expand the size of the text in the region, for easier readability, and a corresponding reduction (zoom out) feature. A "hide" button can also be used to hide the current region. For example, the user may hide a region which is determined to not be a conflict. In this way, the user can more easily isolate the regions of interest. If there are additional regions which cannot be viewed all at once, vertical scrolling arrows 790 and horizontal scrolling arrows 791 as depicted can be selected to view the other regions. Thus scrolling options are provided if there are too many conflicting views to show together.

The detailed information could be displayed in other ways as well, such as in a list. The user can close the pop-up by selecting the X at the upper right hand corner to return to the view 500, for instance. The user can either update the configuration value if there is a conflict, or confirm the current configuration value such as by selecting the "Create" button.

In one option, the pop-up or other format of detailed information is displayed directly without first displaying summary information and having the user select a link. The summary and detailed information could also be displayed together. In another option, there can be more than two levels of detail. For example, three levels can include summary, detail1 and detail2, where detail2 provides more detail than detail1, and detail1 provides more detail than the summary.

The rendering of the pop-up can be achieved using the click handler attached to "Value Reference Summary UX," for instance. The views in the pop-up are read-only snapshots based on the Document Object Models (DOMs) of the views, including styles, where the user entered the same value in the same type of field. The DOM is a programming API for HTML and Extensible Markup Language (XML) documents. It defines the logical structure of documents and the way a document is accessed and manipulated.

In the pop-up display, the hide view option is only for usability and is tracked locally in the browser in the localStorage object of the Window.localStorage API, for example. Accordingly, even if the user hides a region of the view in one browser, the region will again appear if the pop-up is opened in a new browser. Also, users can remove a region of the pop-up manually from localStorage so that it will appear again, in case the decision to hide is reversed.

The summary and detailed displays can be dynamically rendered using HTML and a Cascading Style Sheet CSS implemented via JavaScript.

The contents of the regions 722, 724, 732, 742 and 744 can be a read-only configuration view the user used to configure devices in different NMIs. In one approach, the view_dom, DOM string grabbed will be rendered in this summary view in read-only format/view with the help of disabled: true; style or read-only attributes of input elements.

FIG. 7B depicts an example IP address view for use in the regions 722, 724, 732, 742 and 744 of FIG. 7A, according to some example implementations.
Example code for the view is as follows:
<div id="my-simple-ip-address-view">
  <form style="colorblue;text-align:center;">
  <label>IP Address:</label><br>
  <input type="text" id="ip-address">
  <input type="submit" value="Submit">
  </form>
</div>
Now, view_dom will be: <div id="my-simple-ip-address-view"><form style="colorblue;text-align:center;"> <label>IP Address:</label><br><input type="text" id="ip-address"><input type="submit" value="Submit"> </form></div>.

When rendering in summary view, after parsing the above string to the real DOM, the browser extension converts it to read-only, e.g., using a disabled style properly or a read-only attribute. The read-only view may have a greyed out appearance as depicted in FIG. 7B.

Figure 8:
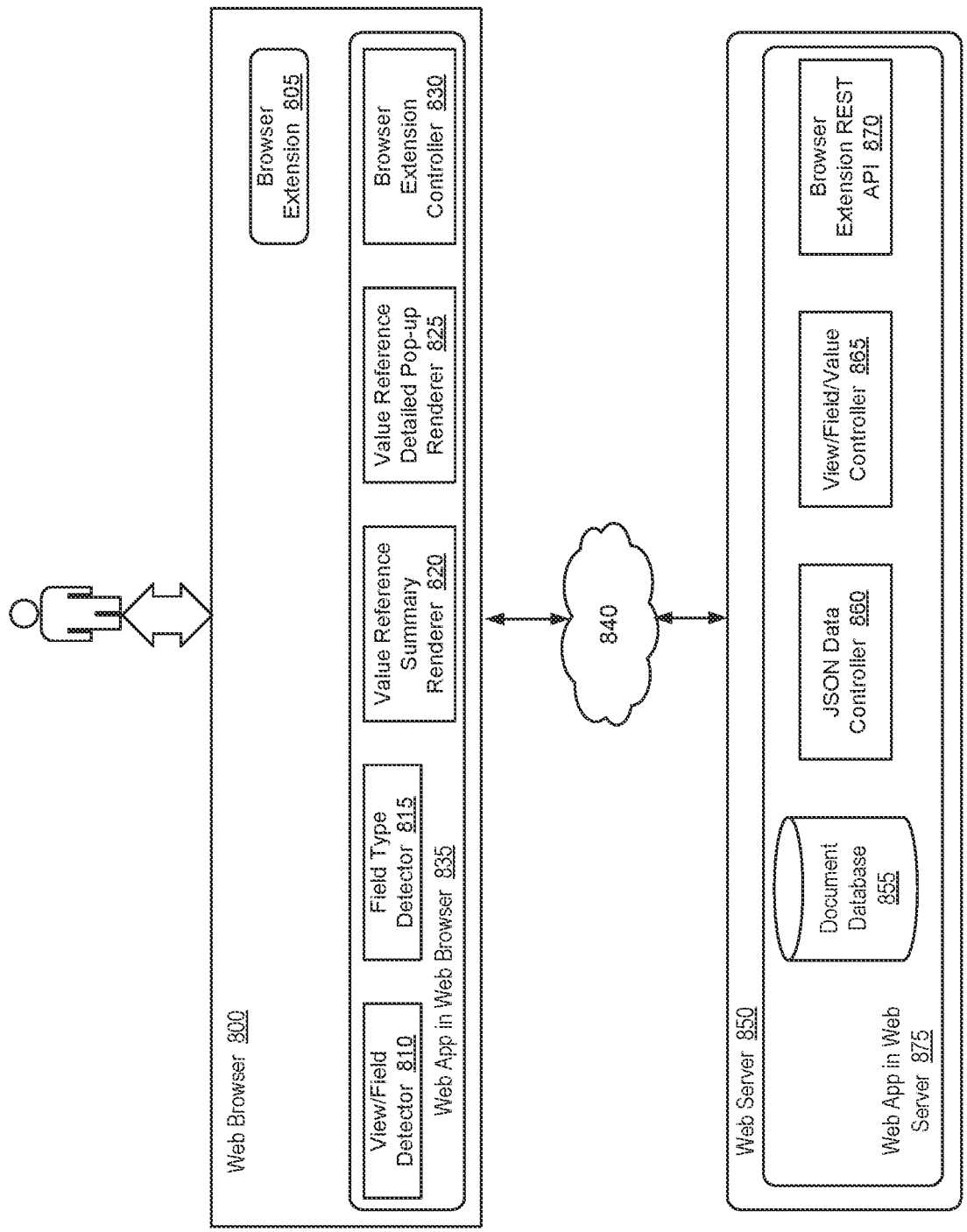
FIG. 8 depicts an overview of the functions of a Web Browser 800 and a Web Server 850 in the computing system of FIG. 1, according to some example implementations.

FIG. 8 depicts an overview of the functions of a Web Browser 800 and a Web Server 850 in the computing system of FIG. 1, according to some example implementations. This is a basic overview of the total system. The Web Browser 800 includes the Browser Extension 805, and a Web App in Web Browser 835. The Web App in Web Browser 835 includes a View/Field Detector 810, a Field Type Detector 815, a Value Reference Summary Renderer 820, a Value Reference Detailed Pop-up Renderer 825, and a Browser Extension Controller 830. The Web Browser 800 communicates with a Web Server 850 via a network 840. The Browser Extension can be used to authenticate to different NMIs as needed.

The Web Server 850 includes a Web App in Web Server 875. The Web App in Web Server 875 includes a Document Database 855, a JSON Data Controller 860, View/Field/Value Controller 865, and a Browser Extension Representational State Transfer (REST) Application Programming Interface (API) 870. The NMI/app owners can provide input on the views, specific fields and field types which are stored in the document database.

The components of the Web Browser 800 and Web Server can represent software and/or hardware. The functions of the components are discussed further in connection with FIGS. 9A and 9B. These are typical sequences involved in the total solution. The total solution depicted is a generic solution.

Any web app can benefit from this system and design to easily see when a user is trying to enter a value to a specific field of a specific view, and where the value was previously used, in the same or another interface/application. A clear user interface can include a snapshot of the views in which the same value was entered to the same field.

Moreover, the solution is not limited to web apps, as long as there is an option to generate the UX elements mentioned and solutions exist to detect values in fields and its views, including at the server side system, it is possible to implement this UX design and system for better usability while using complex configurations, especially when multiple interface configurations are needed for a total solution, and where the chance of the same value being used in the same field exists.

The system allows a user to easily understand when the user is trying to enter a configuration value to a specific field of a specific view, where and all it is used, in the same NMI or any other NMI. The system provides automatic detection of specific views and specific fields based on the app owner's interest, and automatic rendering of a summary of count references, if the value entered is used in the same type of field in any other views of the same NMI or in any other views of the different NMIs. The system further provides automatic rendering of a clear detailed summary of views in which this value entered is used, regardless of whether it is in the same NMI or any other NMI, with a clear form snapshot including options such as zoom in/out to facilitate viewing. The system provides a generic solution for any NMI web apps.

This proposed system includes components in server side, client side and a browser extension. The system assumes the browser extension has the capability to interact with all target NMIs. There are multiple ways to achieve this, such as by allowing access via Access-Control-Allow-Origin policies. The system also assumes there is an existing way to authenticate the browser extension for all the applicable NMIs.

In one approach, the app owner provides information about the specific views and its specific fields which are to be tracked. The UX will be rendered only on these views and field, in one approach. The app owners may also provide information about field types to be automatically tracked and a way to detect them. This information can be provided as a field HTML element type or via its label or via its attribute. In any view of any NMI, whenever this field type is found in a configuration form, this will be tracked.

Different web browsers support their own compatible browser extensions. A browser extension has access to the running web app/web page DOM (Document Object Model) and its JavaScript running context. Using this, it can interact with the running web app and perform operations including rendering via modifications and/or additions to the DOM.

The app owner can provide information about the specific views and its specific fields for which the summary/detailed information is desired. Not all views and fields need this kind of information. For example, fields like "comments" need not have this kind of information. So, app owners won't pass these kinds of fields in the given input. On the other hand, the information should be provided for IP address fields, as an example.

It can be given as a field HTML element type or via its label or via its attribute. Basically, a way should be provided for a solution to detect the field. For example, if the app owner identify an HTML input element number type, then it can be provided as a number input type. Sometimes in web apps, every input field will have a label associated with this. Examples include labels such as "IP address", "Port Number", and "URL." In some other cases, the app owners add specific attributes in input fields to identify the type. Examples include <input type="text" field="URL">. The app owner can provide information about any one of various ways to detect the fields.

In general, wherever a value is rendered to a specific field in the specific view (which is of interest to the app owners), the browser extension detects and checks whether the same value is used in the same type of fields in any other views of same NMI or any other NMI.

Whenever users use any of the NMIs which are to be tracked for, the user should have installed the Browser Extension in the web browser which is used to access the UI. In addition, each NMI may have an API REST interface by which browser extensions can store and fetch information when needed. The browser extensions may further have options to authenticate to each of the NMIs.

The browser extensions may keep polling this information from each NMI periodically such as once per minute or other desired interval.

The UX design shows clearly a snapshot of the view where the user entered a configuration value, if any reference is found. This is achieved again by the browser extension. As mentioned earlier, the app owner has provided input about the type of fields to be tracked. So if any view having this kind of field type is submitted via a configuration form, the browser extension grabs the full DOM including its CSS style and stores it as a DOM string for use in the detailed view. The browser extension will push this information to the corresponding Web App, API REST endpoint and store it in a JSON format. The NMI server side can store these values in a simple Document Database.

Figure 9A:
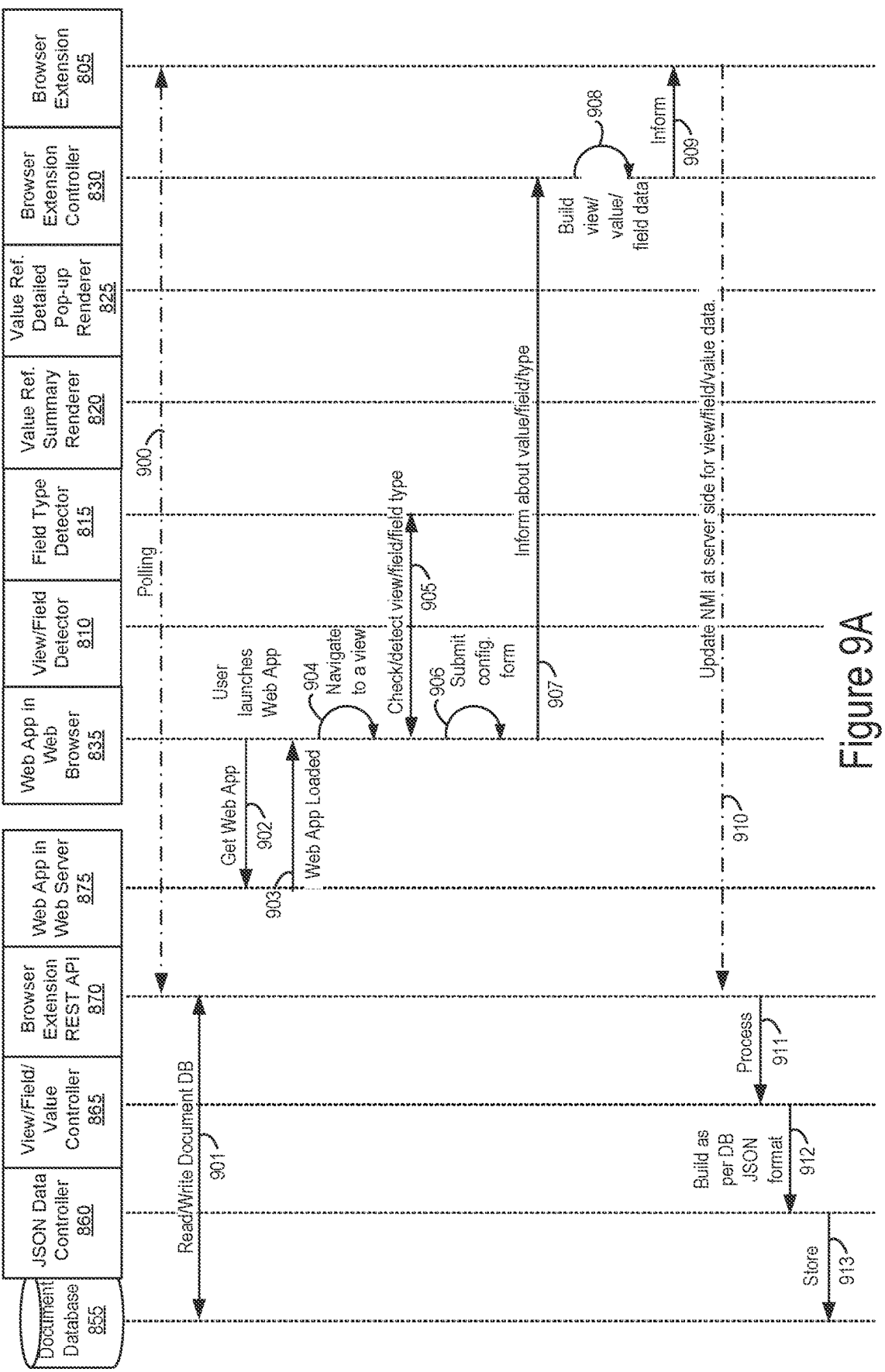
FIG. 9A depicts a first part of an example process flow for the system of FIG. 8 for configuring a network device with configuration form data submission, when there are no duplicate entries, according to some example implementations.
Figure 9B:
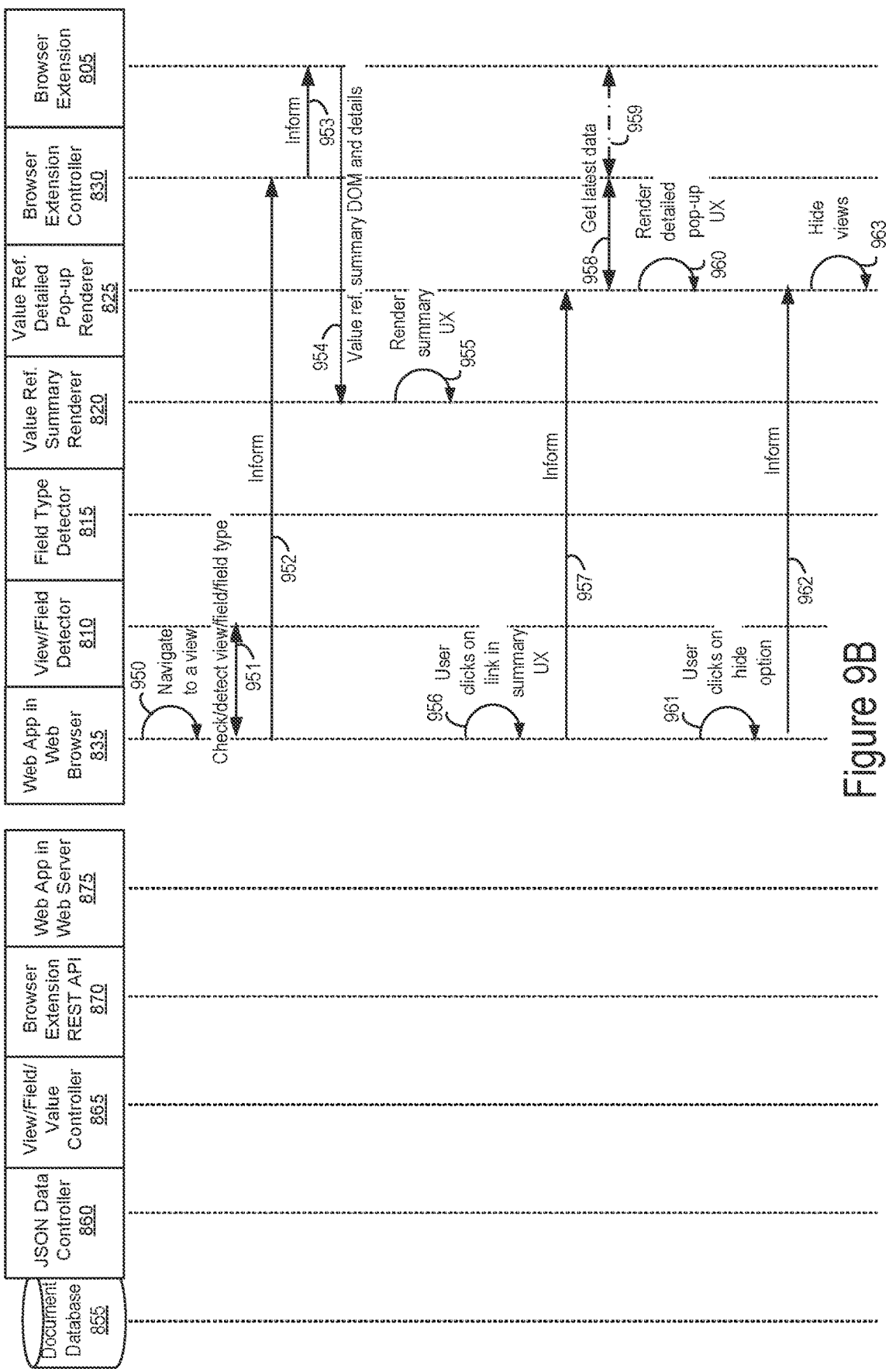
FIG. 9B depicts a second part of an example process flow for the system of FIG. 8, following FIG. 9A, for configuring a network device with configuration data entered in a field of the form, where the user comes out of focus of that field, and a duplicate entry is found, according to some example implementations.

FIGS. 9A and 9B, discussed below, provide two parts of a sequence diagram. FIG. 9A provides a first part, when the user navigates and submits a form. The first flow part is during submission, where it is informed to the browser extension about view/field/value+field-type, and JSON is formed in the JSON database.

In FIG. 9B, the second part is actually whenever a user comes to a configuration form, enters a value in a view field and comes out of focus of the field. The browser extension fetches all previously used view/fields with the same value-field type in any of the NMIs. It shows the summary hyperlink and pop-up view, upon clicking on the hyperlink. The second part is applicable after the first part occurs, because to submit a form, the user comes to the configuration form.

FIG. 9A depicts a first part of an example process flow for the system of FIG. 8 for configuring a network device with configuration form data submission, when there are no duplicate entries, according to some example implementations. In FIGS. 9A and 9B, the flow proceeds from top to bottom, the vertical dashed lines denote which components of FIG. 8 are involved, and the components on the right side are in the Web Browser 800 or client side and the components on the left side are in the Web Server or server side. In Both FIGS. 9A and 9B, the Web Browser 800 side updates its own database before updating a database at the server side, in one possible approach. FIG. 9B has the additional feature of displaying the redundancy information.

FIG. 9A is basically a configuration submission flow. This is the case where the user is coming to the configuration view and submitting it. When there are no duplicate entries, no summary will be shown. For example, this may be at the starting point of the solution, where the users have not yet started using NMIs, and this is the first time a user is using a configuration form in one of the NMIs. No redundant usage will exist at this time.

An arrow 900 indicates the Browser Extension 805 keeps polling multiple NMIs for views and field information in a JSON format, for example. This polling involves communicating with the Browser Extension REST API 870. An arrow 901 indicates reading from, or writing to, the Document Database 855, in response to the polling.

An arrow 902 represents the user launching the Web App in Web Browser 835. An arrow 902 represents the Web App in Web Browser 835 getting code of the web app from the Web App in Web Server 875. An arrow 903 indicates the web app being loaded into the Web App in Web Browser 835. An arrow 904 indicates the user navigating to a configuration view with specific field types, such as in FIG. 3. An arrow 905 indicates checking and detecting the view, field and field type with the field type detector. An arrow 906 indicates the user successfully submitting a configuration form having a specified field type. This example assumes there is no duplication. An arrow 907 indicates the Web App in Web Browser 835 informing the Browser Extension Controller 830 about a value/field/type. An arrow 908 represents the Browser Extension Controller 830 building a view/value/field data in a JSON format, for example. An arrow 909 indicates the Browser Extension Controller 830 informing the Browser Extension 805 of the data for storage in the local database, for example. An arrow 910 indicates the Browser Extension 805 communicating with the Browser Extension REST API 870 to update the server side with the view/value/field data of one or more specific NMIs.

As part of this update, an arrow 911 indicates the Browser Extension REST API 870 performs a process with the View/Field/Value Controller 865, which in turn builds the data as per the database (DB) JSON format, for the JSON Data Controller 860 (arrow 912). An arrow 913 indicates the controller stores the data in the Document Database 855.

FIG. 9B depicts a second part of an example process flow for the system of FIG. 8, following FIG. 9A, for configuring a network device with configuration data entered in a field of the form, where the user comes out of focus of that field, and a duplicate entry is found, according to some example implementations.

This is basically a flow when trying to configure data. The user navigates to a configuration specific view with specific fields. The user then enters a value in that field and comes out of focus. The solution detects if any duplicate entry exists and, if it does exist, shows a summary view.

This example assumes the web app has been loaded to the browser as in FIG. 9A. An arrow 950 depicts a user navigating to a configuration view with specific field types, such as in FIG. 3. These file types can be identified by the app owner. The user enters a value in the field and comes out of focus of the field such as by clicking outside the field or pressing the tab key.

An arrow 951 indicates the Web App in Web Browser 835 checking and detecting the view, field and field type with the View/Field Detector 810. An arrow 952 indicates the Web App in Web Browser 835 informing the Browser Extension 805 controller about the views/fields. An arrow 953 indicates the Browser Extension 805 controller informing the Browser Extension 805 of the views/fields.

An arrow 954 indicates the Browser Extension 805 returning a value reference summary DOM and details to the Value Ref. Summary Renderer 820. An arrow 955 indicates the Value Ref. Summary Renderer 820 rendering a summary user interface (UX) such as depicted in FIG. 5 or 6. An arrow 956 indicates the user clicking on a link in the summary UX, in the Web App of Web Browser 800. In response, an arrow 957 indicates the Web App of Web Browser 800 informing the Value Ref. Summary Renderer 820 of the selection of the link. Arrows 958 and 959 indicate the Value Ref. Summary Renderer 820 getting the latest configuration data from the Browser Extension 805 via the Browser Extension Controller 830. Arrow 960 indicates the Value Ref. Detailed Pop-Up Renderer 825 rendering a detailed pop-up of the views having the duplicate configuration data, such as the example pop-up 710 of FIG. 7A. Arrow 961 indicates the user clicking on the hide option to hide one or more of the views having the duplicate configuration data, in the Web App of Web Browser 800. In response, arrow 962 depicts the Web App of Web Browser 800 informing the Value Ref. Summary Renderer 820 of the request to hide a view. Arrow 963 indicates the Value Ref. Detailed Pop-Up Renderer 825 modifying its rendering to hide the one or more views.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read-only memory (ROM), Flash memory, phase change memory, solid state drives (SSDs) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing"

(and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 10:
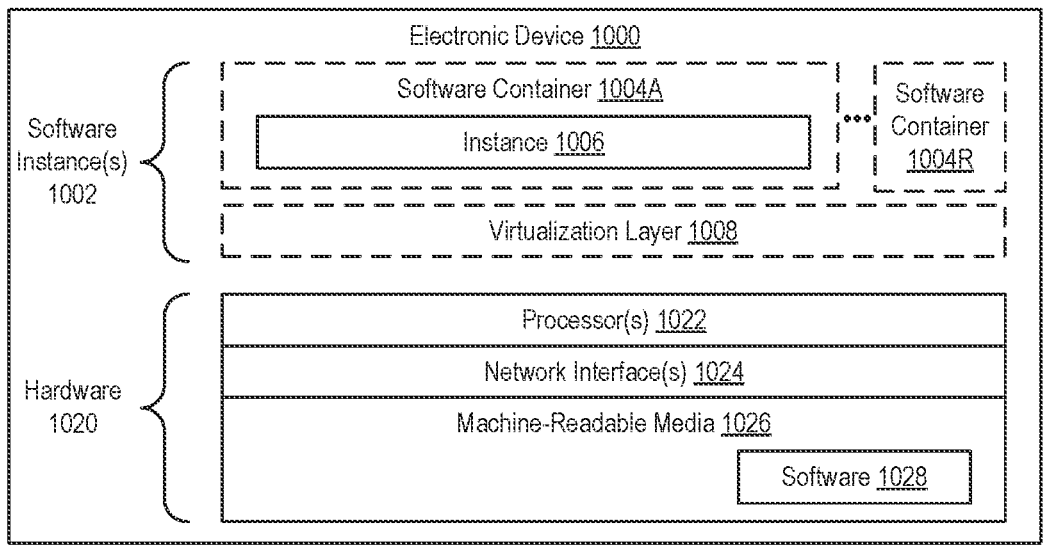
FIG. 10 is a block diagram illustrating an electronic device according to some example implementations.

FIG. 10 is a block diagram illustrating an electronic device 1000 according to some example implementations. One or more of such electronic devices can host the processes and components depicted in FIG. 1.

FIG. 10 includes hardware 1020 comprising a set of one or more processor(s) 1022, a set of one or more network interfaces 1024 (wireless and/or wired), and machine-readable media 1026 having stored therein software 1028 (which includes instructions executable by the set of one or more processor(s) 1022). The machine-readable media 1026 may include non-transitory and/or transitory machine-readable media. Each of the previously described clients and the process for detecting duplicate usages of configuration values may be implemented in one or more electronic devices 1000. In one implementation: 1) each of the clients is implemented in a separate one of the electronic devices 1000 (e.g., in end user devices where the software 1028 represents the software to implement clients to interface directly and/or indirectly with the process for detecting duplicate usages of configuration values (e.g., software 1028 represents a web browser, a native client, a portal, a command-line interface, and/or an application programming interface (API) based upon protocols such as Simple Object Access Protocol (SOAP), Representational State Transfer (REST), etc.)); 2) the process for detecting duplicate usages of configuration values is implemented in a separate set of one or more of the electronic devices 1000 (e.g., a set of one or more server devices where the software 1028 represents the software to implement the process for detecting duplicate usages of configuration values); and 3) in operation, the electronic devices implementing the clients and the process for detecting duplicate usages of configuration values would be communicatively coupled (e.g., by a network) and would establish between them (or through one or more other layers and/or or other services) connections for submitting requests to the process for detecting duplicate usages of configuration values and returning response to the clients. Other configurations of electronic devices may be used in other implementations (e.g., an implementation in which the client and the process for detecting duplicate usages of configuration values are implemented on a single one of electronic device 1000).

During operation, an instance of the software 1028 (illustrated as instance 1006 and referred to as a software instance; and in the more specific case of an application, as an application instance) is executed. In electronic devices that use compute virtualization, the set of one or more processor(s) 1022 typically execute software to instantiate a virtualization layer 1008 and one or more software container(s) 1004A-1004R (e.g., with operating system-level virtualization, the virtualization layer 1008 may represent a container engine (such as Docker Engine by Docker, Inc. or rkt in Container Linux by Red Hat, Inc.) running on top of (or integrated into) an operating system, and it allows for the creation of multiple software containers 1004A-1004R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-1004R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1028 is executed within the software container 1004A on the virtualization layer 1008. In electronic devices where compute virtualization is not used, the instance 1006 on top of a host operating system is executed on the "bare metal" electronic device 1000. The instantiation of the instance 1006, as well as the virtualization layer 1008 and software containers 1004A-1004R if implemented, are collectively referred to as software instance(s) 1002.

Alternative implementations of an electronic device may have numerous variations from that described above. For example, customized hardware and/or accelerators might also be used in an electronic device.

Example Environment

Figure 11:
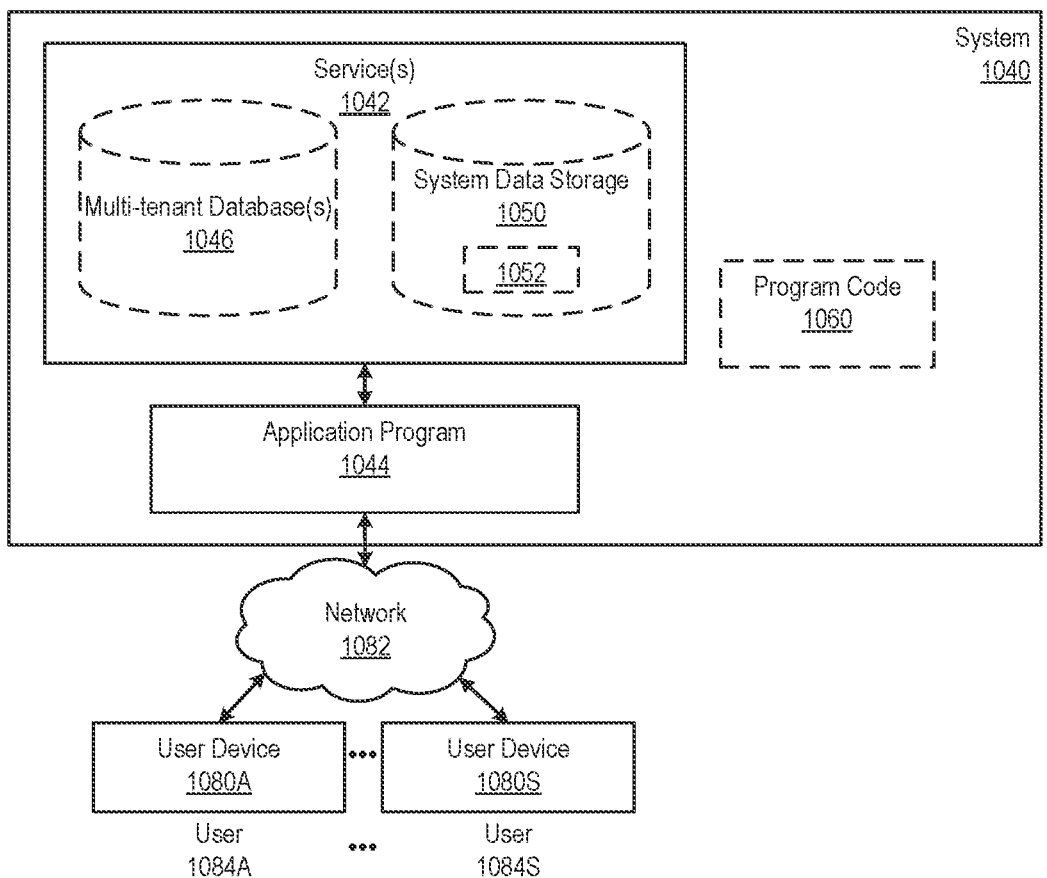
FIG. 11 is a block diagram of a deployment environment according to some example implementations.

FIG. 11 is a block diagram of a deployment environment according to some example implementations. A system 1040 includes hardware (e.g., a set of one or more server devices) and software to provide service(s) 1042, including the process for detecting duplicate usages of configuration values. In some implementations the system 1040 is in one or more datacenter(s). These datacenter(s) may be: 1) first party datacenter(s), which are datacenter(s) owned and/or operated by the same entity that provides and/or operates some or all of the software that provides the service(s) 1042; and/or 2) third-party datacenter(s), which are datacenter(s) owned and/or operated by one or more different entities than the entity that provides the service(s) 1042 (e.g., the different entities may host some or all of the software provided and/or operated by the entity that provides the service(s) 1042). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1040 is coupled to user devices 1080A-1080S over a network 1082. The service(s) 1042 may be on-demand services that are made available to one or more of the users 1084A-1084S working for one or more entities other than the entity which owns and/or operates the on-demand services (those users sometimes referred to as outside users) so that those entities need not be concerned with building and/or maintaining a system, but instead may make use of the service(s) 1042 when needed (e.g., when needed by the users 1084A-1084S). The service(s) 1042 may communicate with each other and/or with one or more of the user devices 1080A-1080S via one or more APIs (e.g., a REST API). In some implementations, the user devices 1080A-1080S are operated by users 1084A-1084S, and each may be operated as a client device and/or a server device. In some implementations, one or more of the user devices 1080A-1080S are separate ones of the electronic device 1000 or include one or more features of the electronic device 1000.

In some implementations, the system 1040 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1040 is a multi-tenant cloud computing architecture supporting multiple services, such as one or more of the following types of services: process for detecting duplicate usages of configuration values (see the system 100 in FIG. 1); Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 1040 may include an application platform 1044 that enables PAAS for creating, managing, and executing one or more applications developed by the provider of the application platform 1044, users accessing the system 1040 via one or more of user devices 1080A-1080S, or third-party application developers accessing the system 1040 via one or more of user devices 1080A-1080S.

In some implementations, one or more of the service(s) 1042 may use one or more multi-tenant databases 1046, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user devices 1080A-1080S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the multi-tenant database(s) 1046 and/or system data storage 1050.

In some implementations, the service(s) 1042 are implemented using virtual applications dynamically created at run time responsive to queries from the user devices 1080A-1080S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the process for detecting duplicate usages of configuration values, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1040 and the user devices 1080A-1080S.

Each user device 1080A-1080S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1040. For example, the user interface device can be used to access data and applications hosted by system 1040, and to perform searches on stored data, and otherwise allow one or more of users 1084A-1084S to interact with various GUI pages that may be presented to the one or more of users 1084A-1084S. User devices 1080A-1080S might communicate with system 1040 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1080A-1080S might include an HTTP client, commonly referred to as a "browser," for sending and receiving HTTP messages to and from server(s) of system 1040, thus allowing users 1084A-1084S of the user devices 1080A-1080S to access, process and view information, pages and applications available to it from system 1040 over network 1082.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. An apparatus comprising:
   one or more processors; and
   a non-transitory machine-readable storage medium that provides instructions that, if executed by the one or more processors, are configurable to cause the apparatus to perform operations comprising:
   receiving an input of a configuration value for a first network device, the configuration value is received via a first view of a first network management interface (NMI);
   at a browser extension of the first NMI, capturing the configuration value and obtaining data regarding one or more other views, other than the first view, in which the configuration value is used; and based on the data, displaying information indicating usage of the configuration value in the one or more other views in one or more NMIs.

2. The apparatus of claim 1, wherein the displaying of the information occurs before a user command to confirm configuring the first network device with the configuration value.

3. The apparatus of claim 1, wherein the operations performed further comprise, at the browser extension, periodically polling one or more remote databases to obtain data regarding usage of configuration values in views of one or more NMIs and updating a local database or browser extension memory with the data regarding usage of configuration values in views of one or more NMIs.

4. The apparatus of claim 1, wherein the operations performed further comprise:
receiving a user command to confirm configuring of the first network device with the configuration value; and
in response to the user command, updating one or more databases to indicate the first network device is configured with the configuration value.

5. The apparatus of claim 1, wherein:
the data comprises a Document Object Model (DOM) and a Cascading Style Sheet Object Model (CSSOM) for the one or more other views; and
the displaying the information comprises rendering the DOM and CSSOM for the one or more other views in a read-only view.

6. The apparatus of claim 1, wherein the information displayed comprises a hyperlink to the one or more other views.

7. The apparatus of claim 1, wherein the one or more other views comprise a second view of the first NMI by which a second network device is configured with the configuration value.

8. The apparatus of claim 1, wherein the one or more other views comprise a view of a second NMI by which a second network device is configured with the configuration value.

9. The apparatus of claim 1, wherein the configuration value comprises at least one of an Internet Protocol (IP) address, a Secure Sockets Layer (SSL) certificate value, a port number, an entity name or a Uniform Resource Locater (URL).

10. A non-transitory machine-readable storage medium that provides instructions that, if executed by a set of one or more processors, are configurable to cause the set of one or more processors to perform operations comprising:
maintaining one or more databases storing data indicating usage of configuration values in views of network management interfaces (NMIs);
receiving periodic polling requests from browser extensions of the NMIs for updates to the data;
transmitting the updates to the data to the browser extensions in response to the periodic polling requests;
receiving information from the browser extensions indicating a new usage of configuration values in views of the NMIs; and
updating the one or more databases based on the information.

11. The non-transitory machine-readable storage medium of claim 10, wherein the data comprises a Document Object Model and a Cascading Style Sheet Object Model for each view of the NMIs.

12. The non-transitory machine-readable storage medium of claim 10, wherein the data identifies one or more views of one or more of the NMIs in which a value, type pair of the configuration values is used.

13. The non-transitory machine-readable storage medium of claim 10, wherein the data comprises, for each view of each NMI, a view identifier which identifies the view, and a field identifier which identifies a tracked field in the NMI.

14. The non-transitory machine-readable storage medium of claim 10, wherein the data comprises, for each view of each NMI, a flag to prevent or allow display of the view by the browser extensions as per user preference.

15. A method, comprising:
at a browser extension of a first network management interface (NMI), capturing a configuration value for a first network device or cloud solution from a first view of the NMI, before a user command to confirm configuring the first network device or cloud solution with the configuration value;
obtaining data regarding one or more potentially conflicting views in which the configuration value has been used to configure a network device or cloud solution;
based on the data, displaying summary information regarding the one or more potentially conflicting views; and
based on the displaying of the summary information, receiving a user selection for detailed information regarding the one or more potentially conflicting views.

16. The method of claim 15, wherein the one or more potentially conflicting views are in different NMIs and the summary information identifies the different NMIs.

17. The method of claim 15, wherein the summary information comprises one or more hyperlinks to the detailed information, and the one or more hyperlinks are overlaid on the first view.

18. The method of claim 15, wherein the summary information indicates a number of the one or more potentially conflicting views.

19. The method of claim 15, wherein the detailed information comprises the one or more potentially conflicting views in a read-only view and scrolling options are provided if there are too many conflicting views to show together.

20. The method of claim 15, wherein:
the configuration value is entered in an input field of the first view; and
the browser extension performs the capturing of the configuration value in response to a click event of a pointing device outside the input field or otherwise coming out of focus of the input field.

* * * * *